United States Patent
Degenhardt et al.

(10) Patent No.: US 10,273,974 B2
(45) Date of Patent: Apr. 30, 2019

(54) CENTRIFUGAL BLOWER UNIT

(71) Applicant: Hanon Systems, Daejeon (KR)

(72) Inventors: Olaf Degenhardt, Pulheim (DE);
Eckart Sievers, Kerpen (DE); Harald Jung, Bornheim (DE); Nico Esser, Bergisch Gladbach (DE)

(73) Assignee: HANON SYSTEMS, Daejeon (KR)

( * ) Notice: Subject to any disclaimer, the term of this patent is extended or adjusted under 35 U.S.C. 154(b) by 541 days.

(21) Appl. No.: 15/166,626

(22) Filed: May 27, 2016

(65) Prior Publication Data
US 2016/0348693 A1 Dec. 1, 2016

(51) Int. Cl.
*F04D 29/42* (2006.01)
*F04D 29/16* (2006.01)
*F04D 17/16* (2006.01)
*F04D 25/08* (2006.01)
*F04D 29/66* (2006.01)
*B60H 1/00* (2006.01)

(52) U.S. Cl.
CPC ......... *F04D 29/4213* (2013.01); *F04D 17/16* (2013.01); *F04D 25/08* (2013.01); *F04D 29/162* (2013.01); *F04D 29/4226* (2013.01); *F04D 29/661* (2013.01); *B60H 2001/006* (2013.01); *F05B 2240/14* (2013.01); *F05B 2240/30* (2013.01); *F05B 2260/96* (2013.01)

(58) Field of Classification Search
CPC ........ F04D 17/16; F04D 25/08; F04D 29/162; F04D 29/4213; F04D 29/441; F04D 29/281; F04D 29/4226; F04D 292/661; B60H 2001/006; F05B 2240/14; F05B 2240/30; F05B 2260/96
See application file for complete search history.

(56) References Cited

U.S. PATENT DOCUMENTS

| | | | |
|---|---|---|---|
| 4,432,694 A * | 2/1984 | Kuroda | F04D 29/162 415/172.1 |
| 5,547,339 A | 8/1996 | Burgers | |
| 6,299,409 B1 * | 10/2001 | Matsunaga | F04D 29/162 415/119 |
| 7,163,371 B2 * | 1/2007 | Higashida | F04D 29/162 415/204 |
| 7,748,954 B2 * | 7/2010 | Eguchi | F04D 29/282 415/119 |
| 9,086,073 B2 * | 7/2015 | Iyer | F04D 25/08 |
| 9,116,420 B2 * | 8/2015 | Yamano | G03B 21/16 |

(Continued)

FOREIGN PATENT DOCUMENTS

| | | |
|---|---|---|
| CN | 1087408 A | 6/1994 |
| DE | 19903359 A1 | 8/1999 |

(Continued)

*Primary Examiner* — David E Sosnowski
*Assistant Examiner* — Sang K Kim
(74) *Attorney, Agent, or Firm* — Shumaker, Loop & Kendrick, LLP; James D. Miller

(57) ABSTRACT

A centrifugal blower unit for motor vehicle air conditioning systems having a fan wheel (8) in a spiral housing (1), wherein the spiral housing (1) corresponds to the shape of the fan wheel (8) and has a bell mouth region (3) and an axial intake opening (2), wherein a diaphragm (4) is arranged at the bell mouth region (3) of the spiral housing (1), being radially inward, whose diaphragm end region (5) bordering the intake opening (2) has at least one sharp edge.

16 Claims, 4 Drawing Sheets

(56) References Cited

U.S. PATENT DOCUMENTS

| | | | |
|---|---|---|---|
| 9,574,565 B2* | 2/2017 | Teramoto | F04D 17/08 |
| 2004/0076514 A1* | 4/2004 | Horng | F04D 29/4213 |
| | | | 415/173.3 |
| 2009/0257876 A1 | 10/2009 | Jarrah et al. | |
| 2012/0315134 A1* | 12/2012 | Chen | G06F 1/203 |
| | | | 415/204 |
| 2018/0142693 A1* | 5/2018 | Sawyer | F04D 29/162 |

FOREIGN PATENT DOCUMENTS

| | | |
|---|---|---|
| DE | 69325931 T2 | 12/1999 |
| JP | 56171699 U1 | 5/1980 |
| JP | H11280697 A | 10/1999 |
| JP | 2000291590 A | 10/2000 |
| JP | 2005171763 A | 6/2005 |
| KR | 20060117012 A | 11/2006 |

* cited by examiner

CENTRIFUGAL BLOWER UNIT

CROSS-REFERENCE TO RELATED PATENT APPLICATION

This application claims priority to DE Patent Application No. 102015108489.9 filed on May 29, 2015, the disclosure of which is incorporated herein by reference in its entirety.

FIELD OF THE INVENTION

The invention concerns a centrifugal blower unit employed in particular in motor vehicle air conditioning systems as a fan or blower in order to generate the air flow required for air conditioning of the vehicle interior, which is then treated in regard to temperature and humidity in the air conditioning system and blown out into the vehicle interior.

BACKGROUND OF THE INVENTION

The centrifugal blower units of this kind have an axial intake region through which air is sucked into the spiral housing of the blower. In the blower, the air is accelerated by the rotating fan wheel and finally blown out in a tangential direction from the spiral housing.

In the prior art, the problem is known that blowers produce high noise emissions and there is a constant desire to reduce the noise emissions specifically in motor vehicles with the least possible technical expense. Noise reduction plays a role in regard to comfort and in regard to safety, since external and internal acoustic warning signals need to be noticed by the driver.

From KR 10-2006-0117012 A, there is known a spiral housing for a centrifugal blower unit in which the housing is formed specially on the intake opening in the axial direction in order to reduce the flow noises of the blower unit. By means of a diaphragm or the shape of the housing edge itself, the edge is tilted in the axial direction toward the fan wheel at the intake region. The resulting annular bulge reduces the noise emission.

Another approach to the solution of the problem of too high flow noises of the blower unit was chosen in JPU 1981-171699. Here, the spiral housing of the centrifugal blower unit was outfitted with a radial diaphragm immediately above the fan wheel, which unlike the previously mentioned design is not tilted in the flow direction, but instead disposed at a right angle to the fan axis.

A different design approach is taken by U.S. Pat. No. 6,299,409 B1, which provides a bell mouth region at the top of the spiral housing of the centrifugal blower unit. The bell mouth region is part of the spiral housing and borders the flow inlet region. Furthermore, the bell mouth region corresponds on the inside to the shape of the fan wheel and optimizes the air flow processes by preventing secondary currents. Thanks to this approach, secondary noise due to the formation of secondary currents has been substantially reduced by means of the bell mouth region.

The problem solutions of the prior art are distinguished in that individual aspects have been achieved in regard to improving the flow characteristics and the attendant noise development, but no truly satisfactory solution to the problem has been found.

SUMMARY OF THE INVENTION

The problem which the invention proposes to solve is thus to design a centrifugal blower unit, especially for motor vehicle air conditioning systems, which enables a comprehensive improvement by reducing the flow noises.

The problem of the invention is solved by the features of patent claim 1. Modifications are given in the dependent patent claims.

The problem of the invention is solved in particular by a centrifugal blower unit which is used preferably for motor vehicle air conditioning systems and which has an axially aspirating fan wheel in a spiral housing with tangential air outlet. The spiral housing corresponds to the shape of the fan wheel so that a bell mouth region is disposed in the spiral housing about an axial intake opening of the spiral housing. According to the invention, the bell mouth region of the spiral housing has a radially inward diaphragm, whose diaphragm end region bordering the intake opening has at least one sharp edge which is situated in the air passage opening as the last edge in the diaphragm end region.

Especially preferably, the diaphragm end region is beveled over the entire thickness of the diaphragm in the air passage direction.

Preferably, the diaphragm is beveled in the diaphragm end region by 45° in the air passage direction.

It has furthermore been found that one advantageous configuration of the invention consists in the diaphragm being formed in the diaphragm end region with a sharp tip having a tip radius of 0.1 mm to 0.5.

Alternatively, the diaphragm end region bordering the intake opening is configured with two right angles parallel to the fan wheel axis.

Again alternatively, the diaphragm end region bordering the intake opening is beveled for a portion of the thickness of the diaphragm in the air passage direction and configured parallel to the fan wheel axis for a portion of the thickness of the diaphragm.

Another alternative configuration of the invention is that the diaphragm end region bordering the intake opening is rounded for a portion of the thickness of the diaphragm in the air passage direction and configured parallel to the fan wheel axis for a portion of the thickness of the diaphragm.

Alternatively, the diaphragm end region bordering the intake opening is rounded for the entire thickness of the diaphragm in the air passage direction.

It has proven to be an advantageous configuration of the diaphragm when the fan wheel blades of the fan wheel are entirely covered by the diaphragm and thus the air inlet does not axially strike the fan wheel blades.

A preferred configuration of the invention is achieved when the intake opening has a ratio to the fan wheel diameter of 1 to 1.4.

According to one modification of the invention, the diaphragm has a length in the radial direction of 7.5 mm.

The diaphragm preferably has a thickness of 2 mm.

According to one advantageous configuration of the invention, the diaphragm is fashioned as a level flat circular ring, whose inner diameter borders the circular intake opening.

Preferably the circular intake opening of the diaphragm has an inner diameter between 90 mm and 110 mm.

It is of great design benefit to the invention that the diaphragm at its outer diameter passes at right angles in the axial direction into the bell mouth region.

The concept of the invention, now summarizing, consists in that a solution to the problem has been found especially in the combination of a bell mouth region of the spiral housing of the centrifugal blower unit with a radially inward extending diaphragm with beveled diaphragm end region. The design is supplemented in that the diaphragm end region is beveled over the entire thickness of the diaphragm. The diaphragm entails a smaller intake opening and, as a result of the individual cooperating measures, a significant improvement in the noise development can be accomplished. Neither the configuration of bell mouth regions on the spiral housing to form the intake opening nor the arranging of diaphragms in isolation from each other will lead to satisfactory results. Only the combination of the different solution approaches of the bell mouth region and the use of a diaphragm and its special configuration at the diaphragm end region lead to the desired success according to the invention.

Besides the described beneficial effects, the smaller internal diameter of the intake opening and the position of the diaphragm between fan wheel and air inlet play a role in the solving of the problem. According to the prior art, the position between fan wheel and air inlet is defined by a central flow against the fan wheel blades. However, one advantageous embodiment of the invention consists in the diaphragm totally overlapping the fan wheel blades.

As a result, it is possible to decrease the overall noise level and thereby improve the noise situation. An improvement in the noise generated leads to significant savings potential in soundproofing measures in motor vehicles, so that structural space and costs can be economized. The noise level in the vehicle interior is reduced and the nuisance of annoying noise to the passengers is minimized.

BRIEF DESCRIPTION OF THE DRAWINGS

Further details, features and benefits of embodiments of the invention will result from the following description of sample embodiments with reference to the corresponding drawings. There are shown.

DESCRIPTION OF EMBODIMENTS OF THE INVENTION

Figure 1:
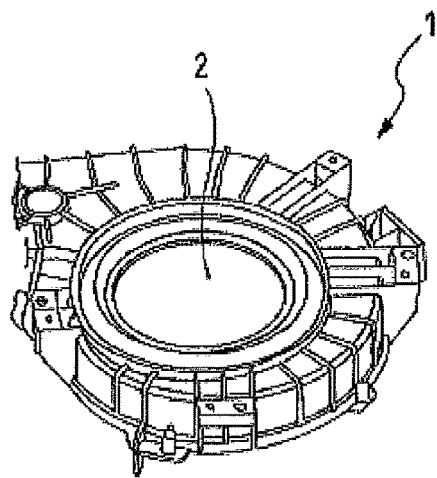
FIG. 1: spiral housing of a centrifugal blower unit in perspective representation.

FIG. 1 shows a perspective view of a spiral housing 1 of a centrifugal blower unit, which is used in motor vehicle air conditioning systems. The intake opening 2 of the centrifugal blower unit is circular in shape. The air taken in goes through the intake opening 2 axially into the spiral housing 1, is accelerated by the fan wheel, not shown in this representation, and leaves the spiral housing 1 at the end of the spiral in the tangential direction.

Figure 2:
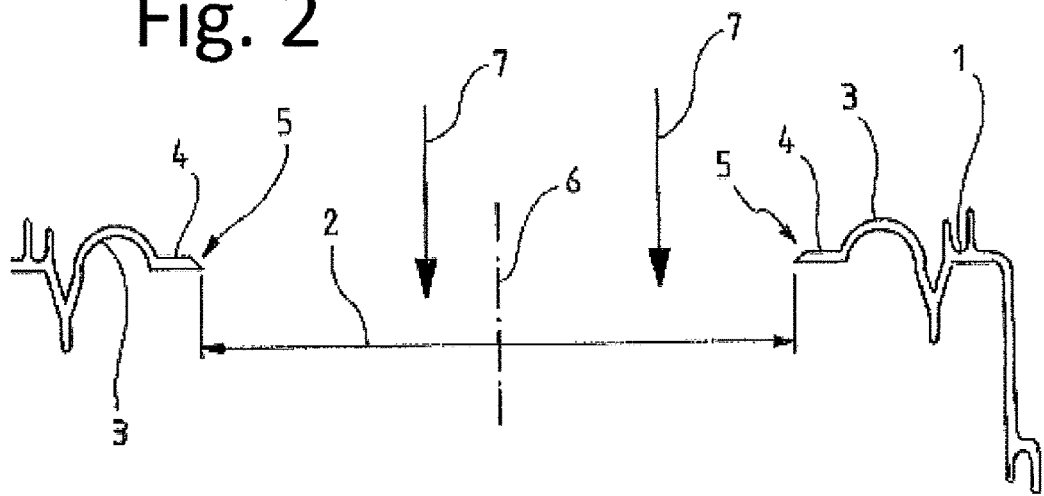
FIG. 2: sectional representation of the spiral housing in the region of the intake opening.

FIG. 2 shows a sectional representation of the spiral housing 1 in the region of the intake opening 2. The fan wheel axis 6 indicates the position of the fan wheel, not represented. In the axial direction, the air passage direction 7 at the intake opening 2 is indicated by arrows. The spiral housing 1 is characterized by a bell mouth region 3 in the area of the intake opening 2, which is characterized in the radial direction by a diaphragm 4 and a beveled diaphragm end region 5 arranged at the end of the diaphragm 4.

Figure 3:
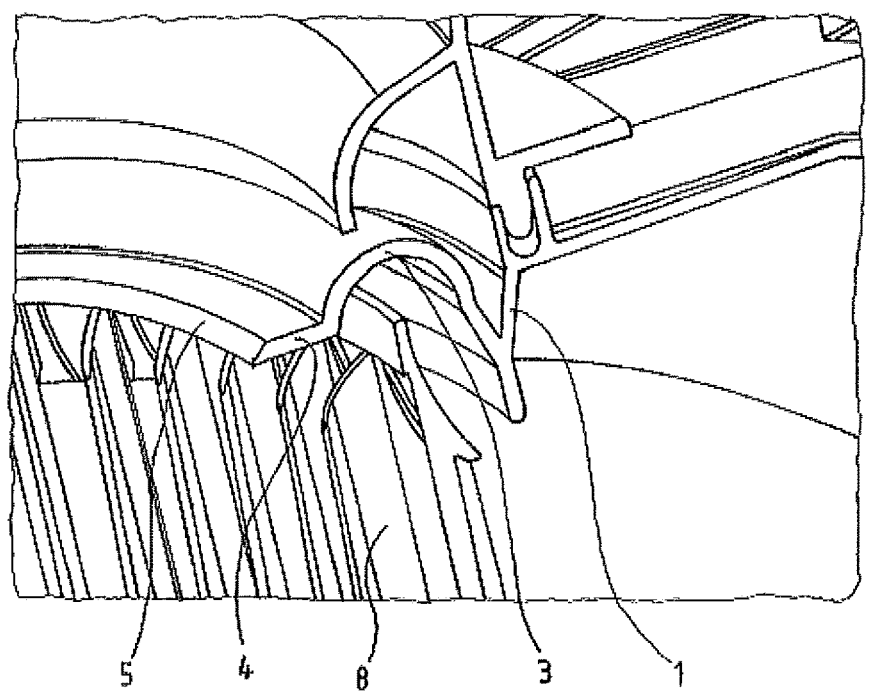
FIG. 3: perspective representation of the fan wheel in combination with the bell mouth region and the diaphragm.

FIG. 3 shows the spiral housing 1 in sectional and perspective view in active connection with the fan wheel 8. One easily recognizes here the interworking of the fan wheel 8 with the bell mouth region 3. The bell mouth region 3 is expanded at its inner end in the radial direction by a diaphragm 4, resulting in a decreasing of the intake opening. The diaphragm 4 is beveled over the entire region of the thickness of the diaphragm 4 in the diaphragm end region 5. The beveling in the diaphragm end region 5 leads to a significant decrease in noise emissions.

Figure 4:
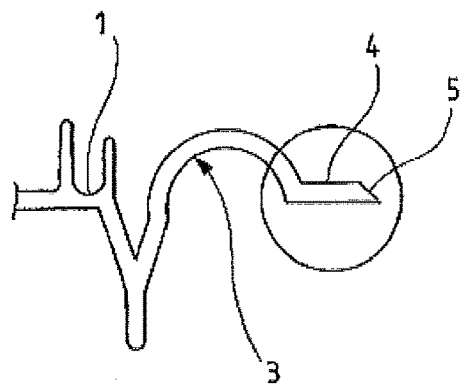
FIG. 4: detail representation of the immediate area of the air intake opening and the spiral housing.

FIG. 4 shows an enlarged detail view of the configuration of the spiral housing 1 in the immediate area of the intake opening 2. The spiral housing 1 is formed toward the intake opening 2 by a bell mouth region 3 with the diaphragm 4 adjoining in the radial direction, having a diaphragm end region 5 with a beveling over the entire thickness of the diaphragm 4. The bell mouth region 3 is semicircular in shape and in the sample embodiment shown has a radius of 5.5 mm. The intake region 2 has a diameter of 105 mm. The fan wheel 8 has a maximum diameter of 150 mm and the boundary inside the spiral housing 1 is indicated as 152 mm.

FIGS. 5A, 5B, 5C, 5D, and 5E show variants of diaphragm end regions 5 of the diaphragms 4 in their arrangement in the air passage direction 7.

Figure 5A:
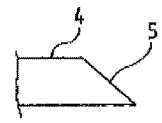
FIGS. 5A, 5B, 5C, 5D, 5E: variants of diaphragm end regions of the diaphragm.

The variant shown in FIG. 5A takes up the design of the diaphragm end region 5 from FIGS. 2, 3 and 4. The diaphragm end region 5 is beveled in the air passage direction 7 over the entire thickness of the diaphragm 4 and the last edge in the diaphragm end region 5 is formed as a sharp edge. The especially preferred variant shown is beveled at an angle of 45° and has a tip radius of the sharp edge of 0.1 to 0.5 mm, while the diaphragm 4 as a whole has a thickness of two millimeters.

Figure 5B:
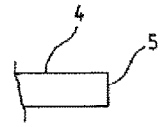

The alternative variant of the configuration of the diaphragm end region 5 shown in FIG. 5B is characterized by two right angles and a coaxially circular-cylindrical envelope surface, while the surface of the diaphragm end region 5 is oriented parallel to the fan wheel axis 6. The fan wheel axis 6 has the same position here as the air passage direction 7 and the diaphragm 4 has a thickness of two millimeters.

Figure 5C:
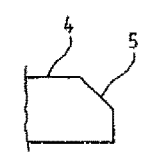

FIG. 5C shows a configuration in which the diaphragm end region 5 in the air passage direction is beveled over a portion of the thickness of the diaphragm 4 and configured parallel to the fan wheel axis 6 for a portion of the thickness of the diaphragm 4. The thickness of the diaphragm 4 on the whole is four millimeters, two millimeters of the thickness being beveled and two millimeters of the diaphragm being configured parallel to the fan wheel axis 6.

Figure 5D:

FIG. 5D shows a configuration of a diaphragm 4 where the diaphragm end region 5 in the air passage direction 7 is rounded for the entire thickness of the diaphragm 4. The diaphragm 4 has a thickness of two millimeters and the radius of the rounding is likewise two millimeters, so that a quarter circle is produced in cross section.

Figure 5E:
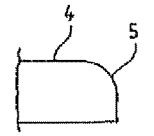

FIG. 5E shows a combination of rounded and parallel diaphragm end region 5. The thickness of the diaphragm 4 here is four millimeters, two millimeters of the thickness being rounded with a radius of two millimeters and two millimeters being parallel to the fan wheel axis 6.

The following table presents the results of experiments with a centrifugal blower unit. Seventeen experiments were recorded, being carried out with different parameters.

In the first two experiments with No. 1 and No. 2, the centrifugal blower unit was operated without a diaphragm in a diaphragm opening per column 3 of 120 mm and an air flow rate per column 4 of 159 liters per second as reference experiments. The current uptake was determined to be 24.5 A and 24.1 A. The noise development occurring here was found to be unsatisfactory.

In experiments No. 3 to No. 7, a diaphragm of cardboard was used, the diaphragm opening varying from 90 mm to 120 mm. The corresponding air flow rates and current strengths are shown in column 4 and column 5. The diaphragm openings of 90 mm and 100 mm were satisfactory and 110 mm was still acceptable. Experiments No. 3 to No. 7 served to determine the optimal diaphragm diameter, which was determined in the range between 90 mm and 110 mm.

Experiments No. 8 to No. 11 were done with a diaphragm made by the SLS method with diaphragm openings of 105 mm and 110 mm and served as preliminary experiments for the subsequent experiments performed with diaphragms of aluminum. The noise development was indicated as satisfactory in experiment No. 8 and No. 11 and borderline in No. 9 and No. 10.

Finally, experiments No. 12 to No. 16 were done with diaphragms of aluminum, the diaphragm opening being 105 mm each time as the result of the preliminary experiments. Contours of the diaphragm end region were now investigated with this series of experiments.

The diaphragm from experiment No. 12 corresponds to the diaphragm shown in FIG. 5d. The noise development was not satisfactory.

The diaphragm from experiment No. 13 corresponds to the diaphragm shown in FIG. 5e. The noise development was not satisfactory.

The diaphragm from experiment No. 14 corresponds to the diaphragm shown in FIG. 5b. The noise development was satisfactory.

The diaphragm from experiment No. 15 corresponds to the diaphragm shown in FIG. 5a. The noise development was satisfactory.

The diaphragm from experiment No. 16 corresponds to the diaphragm shown in FIG. 5c. The noise development was not satisfactory.

Experiment No. 17 was performed with a diaphragm made by the SLS method, selective laser sintering, with adjoining arching and bevels in the housing direction, and the results of the noise development were indicated as borderline. The materials used for the diaphragm can be polyamide or another plastic, a plastic-coated molding sand, a metal or a ceramic powder.

| No. | Diaphragm type and material | diameter [mm] | Total airflow [l/s] | Current strength [A] |
|---|---|---|---|---|
| 1 | no diaphragm | 120 | 159 | 24.5 |
| 2 | no diaphragm | 120 | 159 | 24.1 |
| 3 | diaphragm of cardboard | 90 | 140 | 23.5 |
| 4 | diaphragm of cardboard | 100 | 144 | 23.6 |
| 5 | diaphragm of cardboard | 110 | 156 | 24.7 |
| 6 | diaphragm of cardboard | 115 | 161 | 25.1 |
| 7 | diaphragm of cardboard | 120 | 163 | 25.7 |
| 8 | SLS diaphragm flat | 105 | 152 | 24.9 |
| 9 | SLS diaphragm flat | 110 | 153 | 24.4 |
| 10 | SLS diaphragm with arch | 105 | 151 | 24.3 |
| 11 | SLS diaphragm flat | 105 | 152 | 24.9 |
| 12 | Alu diaphragm with 2 mm radius | 105 | 152 | 24.9 |
| 13 | Alu diaphragm with 2 mm radius and sharp edge | 105 | 151 | 24.1 |
| 14 | Alu diaphragm and sharp edge | 105 | 148 | 24.5 |
| 15 | Alu diaphragm with 2 × 45° bevels | 105 | 152 | 25.0 |
| 16 | Alu diaphragm with 2 × 45° bevels and sharp edge | 105 | 150 | 23.7 |
| 17 | SLS diaphragm with arch and bevels | 105 | 152 | 25.2 |

Figure 6:
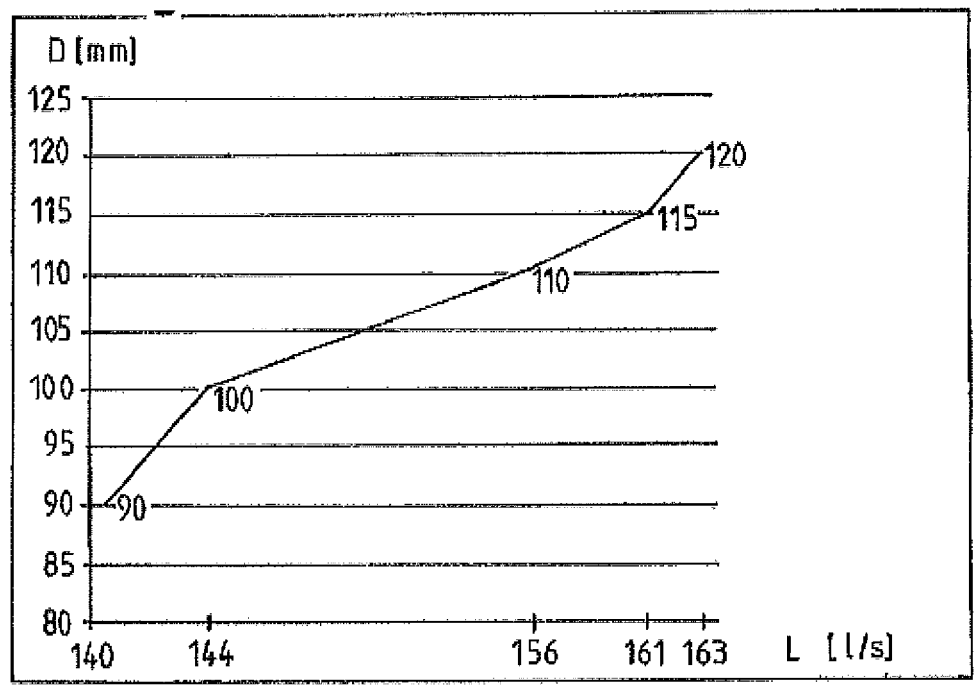
FIG. 6 is a plot of a diaphragm opening against an air flow rate.

FIG. 6 plots the diaphragm opening D, also called the diaphragm diameter, in millimeters (mm) against the air flow rate L in liters of air per second (l/s).

The diagram shows the influence of the diaphragm diameter on the air flow rate. The acceptable noise development is at values between 90 mm and 105 mm diaphragm diameter.

Figure 7:
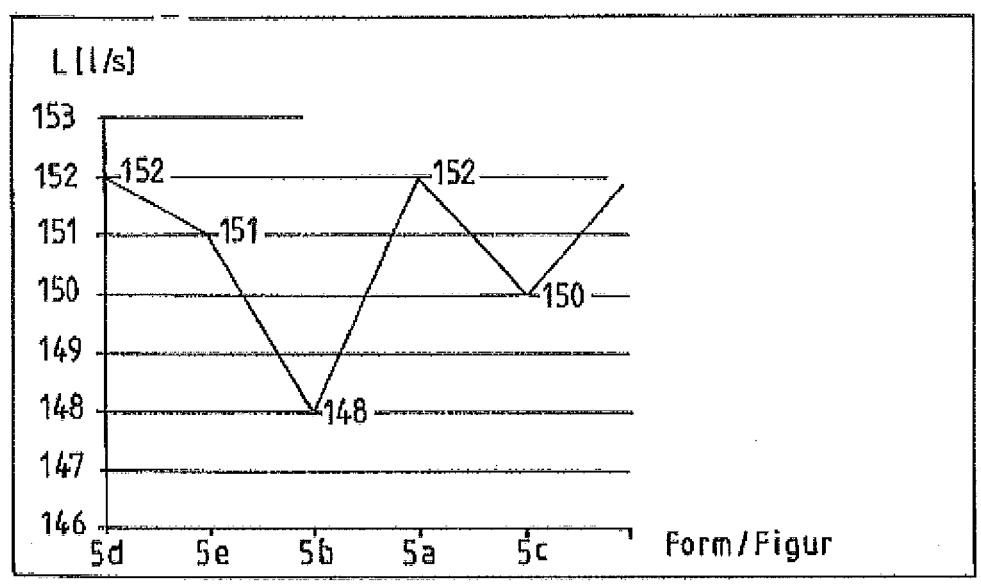
FIG. 7 is a diagram depicting a relationship between an air flow rate and a selected diaphragm shape.

FIG. 7 shows a diagram of the relationship between air flow rate L and the selected diaphragm shape along the x-axis according to the representations in FIGS. 5A, 5B, 5C, 5D and 5E. The aluminum diaphragm according to FIGS. 5A and 5B showed the best behavior in the noise development, while the diaphragm per FIG. 5A showed the best air flow rate.

LIST OF REFERENCE SYMBOLS

1 Spiral housing
2 Intake opening, intake region
3 Bell mouth region
4 Diaphragm
5 Diaphragm end region
6 Fan wheel axis
7 Air passage direction
8 Fan wheel

The invention claimed is:

1. A centrifugal blower unit for a motor vehicle air conditioning system comprising:
   a fan wheel (8) in a spiral housing (1), wherein the spiral housing (1) corresponds to a shape of the fan wheel (8), the spiral housing (1) including a bell mouth region (3) and an axial intake opening (2);
   a diaphragm (4) arranged at the bell mouth region (3) of the spiral housing (1) radially inward, a diaphragm end region (5) bordering the intake opening (2) and having at least one sharp edge which is situated in an air passage direction (7) as a last edge in the diaphragm end region (5);
   wherein the diaphragm extends only in a radial direction from a radial end of a bell mouth of the bell mouth region to the diaphragm end region.

2. The centrifugal blower unit according to claim 1, wherein the diaphragm end region (5) bordering the intake opening (2) is beveled for an entire thickness of the diaphragm (4) in the air passage direction (7).

3. The centrifugal blower unit according to claim 2, wherein the diaphragm (4) is beveled in the diaphragm end region (5) by 45° in the air passage direction (7).

4. The centrifugal blower unit according to claim 2, wherein the diaphragm (4) in the diaphragm end region (5) is configured with a sharp tip with a tip radius of 0.1 mm to 0.5 mm.

5. The centrifugal blower unit according to claim 1, wherein the diaphragm end region (5) bordering the intake opening (2) is configured with two rights angles parallel to the fan wheel axis (6).

6. The centrifugal blower unit according to claim 1, wherein the diaphragm end region (5) bordering the intake opening (2) is beveled for a portion of a thickness of the diaphragm (4) in the air passage direction (7) and configured parallel to the fan wheel axis (6) for a portion of the thickness of the diaphragm (4).

7. The centrifugal blower unit according to claim 1, wherein the diaphragm end region (5) bordering the intake opening (2) is rounded for a portion of a thickness of the diaphragm (4) in the air passage direction (7) and configured parallel to the fan wheel axis (6) for a portion of the thickness of the diaphragm (4).

8. The centrifugal blower unit according to claim 1, wherein the diaphragm end region (5) bordering the intake opening (2) is rounded for an entire thickness of the diaphragm (4) in the air passage direction (7).

9. The centrifugal blower unit according to claim 1, wherein fan wheel blades of the fan wheel (8) are entirely covered by the diaphragm (4).

10. The centrifugal blower unit according to claim 1, wherein the intake opening (2) has a ratio to a fan wheel diameter of 1 to 1.4.

11. The centrifugal blower unit according to claim 1, wherein the diaphragm (4) has a length in a radial direction of the fan wheel axis (6) of 7.5 mm.

12. The centrifugal blower unit according to claim 1, wherein the diaphragm (4) has a thickness of 2 mm.

13. The centrifugal blower unit according to claim 1, wherein the diaphragm (4) is configured as a circular ring and an inner diameter of the diaphragm (4) borders the intake opening (2).

14. The centrifugal blower unit according to claim 1, wherein the intake opening (2) has a diameter between 90 mm and 110 mm.

15. The centrifugal blower unit according to claim 1, wherein the diaphragm (4) at an outer diameter passes at a right angle into the bell mouth region (3).

16. The centrifugal blower unit according to claim 1, wherein the diaphragm (4) is at right angles to a fan wheel axis (6).

* * * * *